Aug. 13, 1935.   D. W. SHERMAN ET AL   2,011,121
METHOD OF MAKING WELDED IRREGULAR SHAPED HOLLOW ARTICLES
Filed June 6, 1934

INVENTORS:
Donald W. Sherman
Arnold G. Schilberg
BY
ATTORNEY.

Patented Aug. 13, 1935

2,011,121

UNITED STATES PATENT OFFICE 2,011,121

METHOD OF MAKING WELDED IRREGULAR SHAPED HOLLOW ARTICLES

Donald W. Sherman, Shorewood, and Arnold G. Schilberg, Milwaukee, Wis., assignors to A. O. Smith Corporation, Milwaukee, Wis., a corporation of New York Application June 6, 1934, Serial No. 729,244

4 Claims. (Cl. 113—116)

This invention aims to provide a novel and efficient method of making welded irregular shaped hollow articles.

Referring to the attached drawing illustrating an embodiment of the invention:

The making of finished hollow articles of an irregular shape such as disclosed in the figures has been a difficut and costly procedure. Previous attempts to divide such an article into component parts which could be resistance welded together to make up the completed shape have in some cases resulted in very poor welds due to improper heating and unsatisfactory shapes for the final pressing together necessary in the making of the weld.

Resistance flash welding is here preferred for use in the manufacture of such an article in that great uniformity of heating is attainable thereby. The mode here provided, of dividing the article to make the flash welding of the same feasible, is best shown in Fig. 1.

Figure 1:
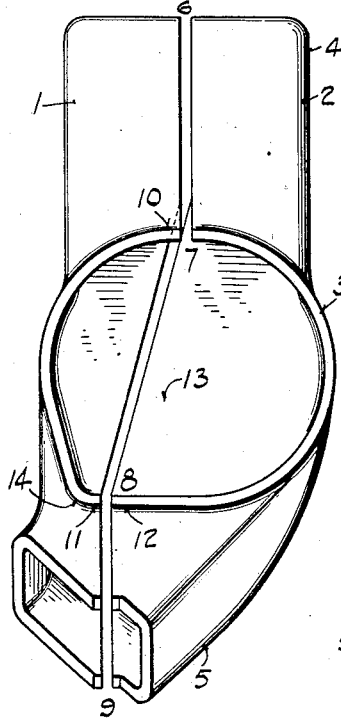
Figure 1 is a plan view of two parts of a hollow article arranged in welding relation.
Figure 2:
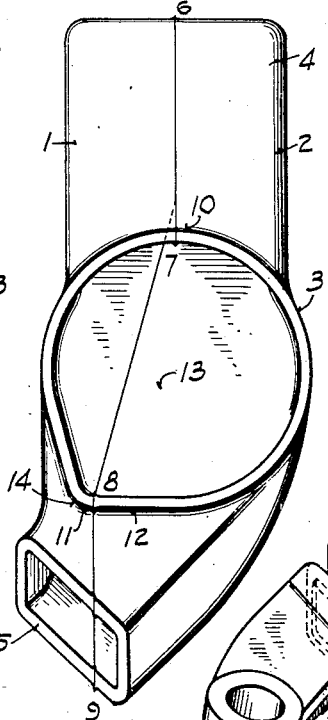
Fig. 2 is a view similar to that of Fig. 1 in which the parts have been joined by welding.
Figure 3:
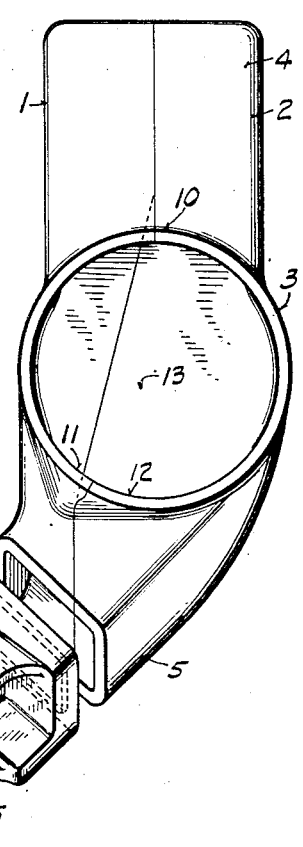
Fig. 3 is a view similar to Figs. 1 and 2, showing further steps in the making of such a hollow article.

Referring to Fig. 1. Two hollow pressed metal parts 1 and 2 of particular shape have been provided, and are shown with their meeting edges in juxtaposition for welding together. Fig. 2 shows parts 1 and 2 after welding and Fig. 3 shows the final article composed of parts 1 and 2.

Referring to the figures, the article illustrated comprises a substantially tubular portion 3, a protuberance 4, extending laterally therefrom, and a second protuberance 5, extending laterally from tubular portion 3 on the side opposite to that from which 4 extends. Protuberance 5 extends from the portion 3 in a direction which is not parallel to, but rather at an angle to the direction in which protuberance 4 extends from the portion 3.

Parts 1 and 2 are constructed to meet each other along their juxtaposed edges in a surface 6, 7, 8, and 9. Protuberance 4 and the adjacent wall 10 of tubular portion 3 are divided by plane 6—7. Protuberance 5 and adjacent wall 11 and 12 of tubular member 3 are divided by a second plane 8—9 which lies substantially parallel to plane 6—7. The tubular walls at positions 11 and 12 of parts 1 and 2, respectively, are constructed substantially at right angles to plane 8—9. Edge walls of portion 3 at positions 10 are arranged substantially perpendicular to plane 6—7.

Figure 4:
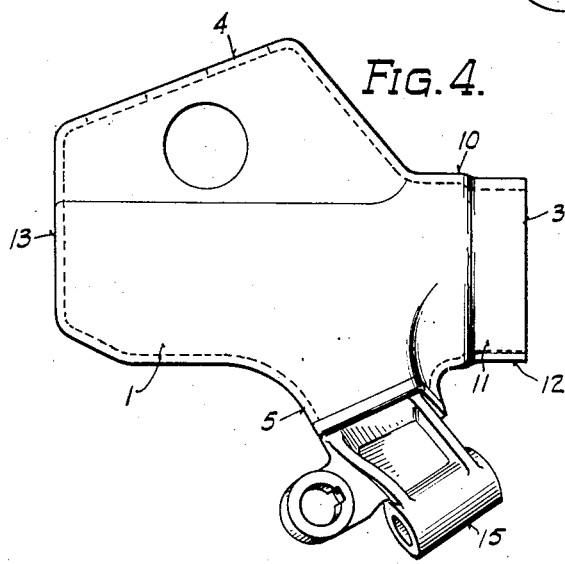
Fig. 4 is an elevational view of the completed article of Fig. 3 viewed from the left of that figure.

Tubular portion 3 is provided with a closing head portion 13 shown also in Fig. 4. Plane 7—8 of dividing surface 6, 7, 8, and 9 divides head 13 into juxtaposed edges for welding and head 13 is substantially perpendicular to parallel planes 6—7 and 8—9.

After the parts of the article are formed and arranged in the manner above described, parts 1 and 2 are advanced toward each other in a direction perpendicular to dividing planes 6—7 and 8—9, and flash welding currents are passed between the edges to heat the same, after which said edges are pressed together to weld the parts to each other as shown in Fig. 2. By the above arrangement and procedure the meeting edges are maintained in proper alignment during their movement and while heating them by means of the flashing arc.

Following the completion of the welding operation the angular portion 14 of tubular part 3 is reformed between forming dies to put said tubular part in circular shape as shown in Fig. 3. Fig. 3 also shows an end bracket placed in position for welding to the article on the end of protuberance 5.

Fig. 4 is an elevational view taken from the left of Fig. 3 showing the article after bracket 15 has been welded on.

By proceeding as above described it has been made possible to efficiently and cheaply manufacture, by flash welding, articles of irregular shape similar to those here illustrated, eliminating the many difficulties heretofore encountered in other attempts to produce such articles by welding.

We claim:

1. The method of making a hollow metal article having a substantially tubular body and two hollow protuberances projecting therefrom on opposite sides thereof but in obliquely diverging directions, comprising forming two substantially complementarily cupped parts to complete the article with their assembled edges in abutting relation and separated along a dividing line which lies principally in two parallel planes one of which passes through one protuberance and includes the axis of said tube and the other of which is displaced laterally to pass through the second protuberance and include a longitudinal element of said tube, the surfaces of said tube parts at such element being at right angles to such second dividing plane, and flash welding said cup-shaped parts together at their meeting edges.

2. The method of making a hollow metal article having a substantially tubular body with two protuberances extending from opposite sides thereof but in directions oblique to each other, comprising providing two cupped parts with their edges in juxtaposed welding relation to constitute the whole, said parts being separated principally by a pair of parallel dividing planes separated laterally from each other, each such plane passing through a protuberance and intersecting said tubular body in a longitudinal element, the surface of said tubular body being substantially perpendicular to said plane at said element, advancing said parts relatively toward each other in a direction at right angles to said parallel planes and passing a heating flash welding current therebetween, and finally pressing the parts together to form the article by welding.

3. The method of welding a hollow tubular body having protuberances extending laterally therefrom which comprises constructing the parts of the body to be joined with at least one plane of division between said parts passing through a protuberance and including a longitudinal element of said tubular body, said plane lying parallel to but separated from the axis of said tubular body, forming an offset in said body to cause its wall to intersect said plane at right angles at said included longitudinal element, welding the parts together by flash resistance welding at their meeting surfaces, and reforming a portion of said tubular body portion into a true circular form.

4. The method of making a hollow metal article having a substantially tubular body and two hollow protuberances projecting therefrom on opposite sides thereof but in obliquely diverging directions, comprising forming two substantially complementary cupped parts to complete the article with their assembled edges in abutting relation and separated along a dividing line which lies principally in two parallel planes one of which passes through one protuberance and includes the axis of said tube and the other of which is displaced laterally to pass through the second protuberance and include a longitudinal element of said tube, forming said tube parts at said longitudinal element to present surfaces at right angles to said second dividing plane, and flash welding said cup-shaped parts together at their meeting edges.

DONALD W. SHERMAN.
ARNOLD G. SCHILBERG.